United States Patent [19]

Cardozo

[11] Patent Number: 4,790,573
[45] Date of Patent: Dec. 13, 1988

[54] SEALING SYSTEM BETWEEN A METAL INSERT AND PLASTIC COUPLING, AND RESULTING PRODUCT

[75] Inventor: Daniel A. Cardozo, Joinville, Brazil

[73] Assignee: Tubos e Conexoes Tigre S/A, Brazil

[21] Appl. No.: 65,990

[22] Filed: Jun. 24, 1987

[30] Foreign Application Priority Data

Jul. 7, 1986 [BR] Brazil .................................. 8603153

[51] Int. Cl.⁴ ............................................. F16L 25/00
[52] U.S. Cl. .................................... 285/330; 285/392; 285/423
[58] Field of Search ................. 285/392, 174, 330, 92, 285/423; 411/82, 100

[56] References Cited

U.S. PATENT DOCUMENTS

| | | | |
|---|---|---|---|
| 1,895,022 | 1/1933 | Chandler | 285/423 X |
| 2,954,246 | 9/1970 | Totah et al. | 285/330 |
| 3,936,078 | 2/1976 | Wallyn | 285/330 X |
| 4,428,602 | 1/1984 | Lambut et al. | 285/174 X |

FOREIGN PATENT DOCUMENTS

| | | | |
|---|---|---|---|
| 2307467 | 9/1973 | Fed. Rep. of Germany | 285/174 |
| 994294 | 6/1965 | United Kingdom | 285/330 |

Primary Examiner—Dave W. Arola
Attorney, Agent, or Firm—Darby & Darby

[57] ABSTRACT

Provision is made for installation, in the interior of a plastic coupling, of a cylindrical tubular-shaped metal insert with internal threads and having an externally knurled external flange at one end, followed by an intermediate section whereon external teethlike serrations or the like are provided, finally followed by a circumferential recess to house an elastic sealing ring, which insert is installed in the plastic coupling after the latter has been molded, and by embedding through transmission of pressure and heat.

2 Claims, 1 Drawing Sheet

SEALING SYSTEM BETWEEN A METAL INSERT AND PLASTIC COUPLING, AND RESULTING PRODUCT

FIELD OF THE INVENTION

The present invention relates to sealing systems between a metal insert and a plastic coupling.

BACKGROUND OF THE PRIOR ART

As is known in the art, plastic couplings exist having internal metal inserts, designed to increase their strength and to avoid possible breakage when subjected to high stress; moreover, such metal inserts allow for an increase in abrasion resistance of the internal threads of the usual plastic couplings.

Such metal inserts are attached to the couplings during the actual injection molding thereof and, owing to the fact that the metal and plastic are materials having an entirely different molecular composition, a continuous joint between the two parts seldom occurs, with discontinuities being formed that lead to leakage; for this reason, a high number of couplings have to be discarded since they fail to provide the required sealing effect, thus causing heavy loss of materials and labor, and thus influencing the final cost of the part.

SUMMARY OF THE INVENTION

To provide a solution of such inconveniences, the present invention has been created, whereby the insert is mounted in the interior of the coupling after molding of the latter and through an embedding system by transmission of heat and pressure, with the seal between the insert and coupling being assured by a sealing ring which is permanently pressed between the faces of the two parts.

With this improvement, the insert is more easily made secure to the coupling, since the former is installed in the latter after molding thereof; furthermore, there is no risk of leakage since the sealing ring provided between the two parts ensures imperviousness in the assembly.

BRIEF DESCRIPTION OF THE DRAWINGS

For purposes of illustration, attached drawings of the present invention are provided, whereby a better visualization thereof is made possible.

DESCRIPTION OF THE PREFERRED EMBODIMENTS

Figure 1:
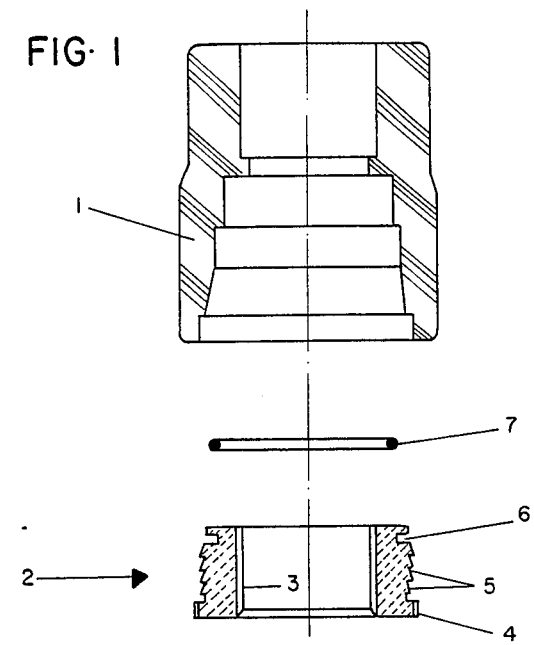
FIG. 1 is a lateral cross section of the inventive insert, prior to being mounted in the usual plastic coupling.
Figure 2:
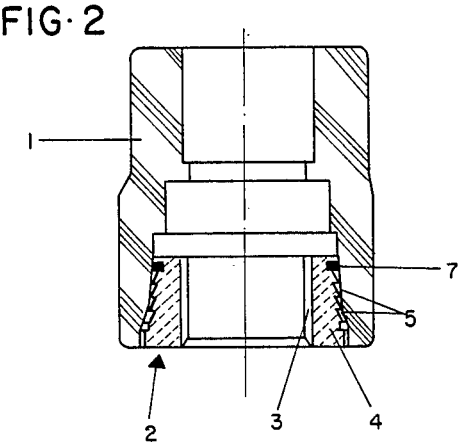
FIG. 2 illustrates the insert already mounted in the coupling, wherein the sealing ring compressed between the two parts can now be seen.

An object of the present is to provide an improvement in the sealing system between a metal insert and plastic coupling and the resulting product, whereby provision is made for installation, in the interior of a plastic coupling (1), of a cylindrical tubular-shaped metal insert (2) with internal threads (3) having an externally knurled external flange (4) at one end, followed by an intermediate section whereon external teethlike serrations (5) or the like are provided, finally followed by a circumferential recess (6) to house an elastic sealing ring (7).

According to the present invention, installation of the insert (2) in the interior of the plastic coupling (1) is performed after the latter is molded, and by embedding through transmission of heat and pressure, during which the external teethlike insert serrations (5) become securely embedded in the inside face of the coupling, becoming attached thereto; in turn, the sealing ring (7) is compressed by the internal face of the coupling, to thus provide effective sealing action.

I claim:

1. An improvement in a sealing system comprising: a plastic coupling; a metal insert being installed in the interior of said plastic coupling; said metal insert having a cylindrical tubular-shaped part with internal threads and having an externally knurled external flange at one end, followed by an intermediate section whereon external teethlike serrations are provided, and further followed by a circumferential recess; and an elastic sealing ring disposed in said recess.

2. The improvement according to claim 1, wherein said insert is installed in the interior of the plastic coupling after the latter has been molded, by embedding during the installation through transmission of heat and pressure, so that the external teethlike insert serrations become embedded in the inside face of the coupling and become attached thereto, with the sealing ring, in turn, being compressed by the internal face of the coupling, to thus provide effective sealing action.

* * * * *